United States Patent
Recupero

(10) Patent No.: US 9,298,634 B2
(45) Date of Patent: Mar. 29, 2016

(54) CLIENT SPATIAL LOCALITY THROUGH THE USE OF VIRTUAL REQUEST TRACKERS

(71) Applicant: Gregory Recupero, Marshfield, MA (US)

(72) Inventor: Gregory Recupero, Marshfield, MA (US)

(*) Notice: Subject to any disclaimer, the term of this patent is extended or adjusted under 35 U.S.C. 154(b) by 87 days.

(21) Appl. No.: 14/198,494

(22) Filed: Mar. 5, 2014

(65) Prior Publication Data

US 2014/0258639 A1 Sep. 11, 2014

Related U.S. Application Data

(60) Provisional application No. 61/773,347, filed on Mar. 6, 2013.

(51) Int. Cl.
*G06F 3/00* (2006.01)
*G06F 13/28* (2006.01)
*G06F 5/00* (2006.01)
*G06F 12/08* (2006.01)

(52) U.S. Cl.
CPC .... *G06F 12/0862* (2013.01); *G06F 2212/1041* (2013.01); *G06F 2212/304* (2013.01); *G06F 2212/6022* (2013.01); *G06F 2212/6026* (2013.01); *G06F 2217/08* (2013.01)

(58) Field of Classification Search
CPC ............... G06F 3/0679; G06F 3/0688; G06F 2212/1041; G06F 2217/08
USPC ....................................... 710/1, 8, 23, 53, 57
See application file for complete search history.

(56) References Cited

U.S. PATENT DOCUMENTS

| | | | | |
|---|---|---|---|---|
| 6,038,639 A | * | 3/2000 | O'Brien et al. ...... | G06F 11/1435 711/114 |
| 6,317,810 B1 | * | 11/2001 | Lopez-Aguado ..... | G06F 9/3802 711/120 |
| 6,754,779 B1 | * | 6/2004 | Magro ................ | G06F 12/0862 710/22 |
| 7,917,702 B2 | | 3/2011 | Morrow et al. | |
| 8,103,832 B2 | | 1/2012 | Gara et al. | |
| 8,271,736 B2 | | 9/2012 | Gupta et al. | |
| 2005/0289301 A1 | * | 12/2005 | Woo ..................... | G06F 12/0862 711/137 |
| 2010/0241807 A1 | * | 9/2010 | Wu .................... | G06F 17/30233 711/118 |
| 2010/0299667 A1 | * | 11/2010 | Ahmad ............... | G06F 12/1018 718/1 |
| 2012/0079202 A1 | | 3/2012 | Chirca | |

* cited by examiner

*Primary Examiner* — Idriss N Alrobaye
*Assistant Examiner* — Getente A Yimer
(74) *Attorney, Agent, or Firm* — North Shore Patents, P.C.; Michele Liu Baillie

(57) ABSTRACT

A memory request optimizer includes a memory tracker for receiving a read request from client devices and for determining whether the request address matches any of the virtual request trackers. If the request address does not match any virtual request tracker, an allocation logic allocates a next available virtual request tracker to track the request address. When the request address matches a virtual request tracker, a prefetch logic increments a current tracker match count for the virtual request tracker and determines whether a linear history of tracker match counts indicates a prefetch of a next request data is appropriate based on one or more predetermined criteria. If the linear history indicates the prefetch is appropriate, the prefetch logic obtains the next request data at an address equal to the request address plus a preconfigured request offset from the memory sub-system and stores the next request data in a cache.

15 Claims, 6 Drawing Sheets

Before Allocation:

| Back | | | | | | | Front |
|---|---|---|---|---|---|---|---|
| 0 | 5 | 4 | 3 | 6 | 7 | 1 | 2 |

After Allocation:

| Back | | | | | | | Front |
|---|---|---|---|---|---|---|---|
| 2 | 0 | 5 | 4 | 3 | 6 | 7 | 1 |

FIG. 4A

Before Match:

| Back | | | | | | | Front |
|---|---|---|---|---|---|---|---|
| 0 | 5 | 4 | 3 | 6 | 7 | 1 | 2 |

After Match:

| Back | | | | | | | Front |
|---|---|---|---|---|---|---|---|
| 7 | 0 | 5 | 4 | 3 | 6 | 1 | 2 |

FIG. 4B

CLIENT SPATIAL LOCALITY THROUGH THE USE OF VIRTUAL REQUEST TRACKERS

CROSS-REFERENCE TO RELATED APPLICATIONS

The present application is a non-provisional of U.S. provisional application Ser. No. 61/773,347, filed on Mar. 6, 2013.

BACKGROUND OF THE INVENTION

Systems on a chip (SOCs) comprise many system clients, each contending for memory resources. Clients include multi-threaded/multi-issue central processing units (CPUs), high-end graphics processing units (GPUs), video encode/decode engines, and audio subsystem, etc. A design challenge for SOCs is to ensure that each client's memory requirements are satisfied, while also producing the most power efficient design. One design consideration is memory latency or the time a client would wait for requested data from memory. Memory latency affects the overall system performance. Many CPU cycles may be wasted waiting for a data or instruction fetch, which in turn waste power and lowers processor utilization. Some designs address this challenge by increasing the processor clock rate, increasing cache sizes, adding an additional processor, and/or use a predictive scheme. However, these approaches either increase power consumption, increase silicon area impact, and/or increase the overall cost of the system or both.

BRIEF SUMMARY OF THE INVENTION

According to one embodiment of the present invention, a memory request optimizer is coupled to a plurality of client devices and a memory sub-system. The memory request optimizer includes a cache and a memory tracker. The memory tracker receives a read request from one of the plurality of client devices, where the read request includes a request address. The memory tracker determines whether the request address matches one of a plurality of available virtual request trackers. The memory tracker includes an allocation logic. If the request address does not match any of the plurality of available virtual request trackers, the allocation logic allocates a next available virtual request tracker from the plurality of available virtual request trackers to track the request address. The memory tracker further includes a prefetch logic. When the request address matches a given virtual request tracker of the plurality of available virtual request trackers, the prefetch logic increments a current tracker match count for the given virtual request tracker and determines whether a linear history of tracker match counts for the given virtual request tracker indicates a prefetch of a next request data is appropriate based on one or more predetermined criteria. If the linear history indicates the prefetch of the next request data is determined to be appropriate, the prefetch logic obtains the next request data at an address equal to the request address plus a preconfigured request offset from the memory sub-system and stores the next request data in the cache.

In one aspect of the present invention, the allocation logic further updates the plurality of available virtual request trackers using a least recently used algorithm.

In one aspect of the present invention, the memory request optimizer further includes a tracker array comprising the plurality of available virtual request trackers. In allocating the next available virtual request tracker, the allocation logic further allocates the next available virtual request tracker from a front of the tracker array, moves the allocated virtual request tracker to a back of the tracker array, and shifts remaining virtual request trackers of the plurality of available virtual request trackers toward the front of the tracker array.

In one aspect of the present invention, the memory request optimizer further includes a tracker array comprising the plurality of available virtual request trackers. When the request address matches the given virtual request tracker, the allocation logic shifts the virtual request trackers behind the given virtual request tracker in the tracker array toward a front of the tracker array, and moves the given virtual request tracker to a back of the tracker array.

In one aspect of the present invention, in incrementing the current tracker match count for the given virtual request tracker, the prefetch logic further determines whether the current tracker match count is less than a maximum match count, and if the current tracker match count is less than the maximum match count, increments the current tracker match count. If the current tracker match count is not less than the maximum match count, the prefetch logic shifts the tracker linear history array toward a back of the tracker linear history array, initiates the current tracker match count, and stores the initiated current tracker match count at a front of the tracker linear history array.

In one aspect of the present invention, the one or more predetermined criteria comprises a preconfigured frequency of prefetches.

In one aspect of the present invention, the one or more predetermined criteria includes a low optimization mode. In this mode, the prefetch logic determines whether a previous tracker match count in the linear history for the given virtual request tracker is greater than the current tracker match count, and if the previous tracker match count is greater than the current tracker match count, obtains the next request data at the address equal to the request address plus the preconfigured request offset from the memory sub-system.

In one aspect of the present invention, the one or more predetermined criteria includes a moderate optimization mode. In this mode, the prefetch logic determines whether the current tracker match count is greater than zero, and if the current tracker match count is greater than zero, obtains the next request data at the address equal to the request address plus the preconfigured request offset from the memory sub-system.

In one aspect of the present invention, the one or more predetermined criteria comprises an aggressive optimization mode. In this mode, the prefetch logic determines if a previous tracker match count in the linear history for the given virtual request tracker is greater than the current tracker match count or if the current tracker match count is greater than zero, and if the previous tracker match count is greater than the current tracker match count or if the current tracker match count is greater than zero, obtains the next request data at the address equal to the request address plus the preconfigured request offset from the memory sub-system.

In one aspect of the present invention, if the request address does not match any of the plurality of virtual request trackers, the prefetch logic records the request address in the newly allocated virtual request tracker, stores a previous tracker match count for the allocated virtual request tracker in a tracker linear history for the newly allocated virtual request tracker, and initiates a current tracker match count for the newly allocated virtual request tracker.

In one aspect of the present invention, the memory request optimizer further includes a tracker linear history array comprising a linear history of tracker match counts for the allocated virtual request tracker. The prefetch logic further shifts the tracker linear history array for the newly allocated virtual request tracker toward a back of the tracker linear history array for the newly allocated virtual request tracker, initiates a current tracker match count for the newly allocated virtual request tracker, and stores the current tracker match count for the newly allocated virtual request tracker in a front of the tracker linear array for the allocated virtual request tracker.

BRIEF DESCRIPTION OF THE SEVERAL VIEWS OF THE FIGURES

FIG. 4A illustrates an example of a tracker array when the request address does not match a virtual request tracker.

FIG. 4B illustrates an example of a tracker array when the request address matches a virtual request tracker.

DETAILED DESCRIPTION OF THE INVENTION

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
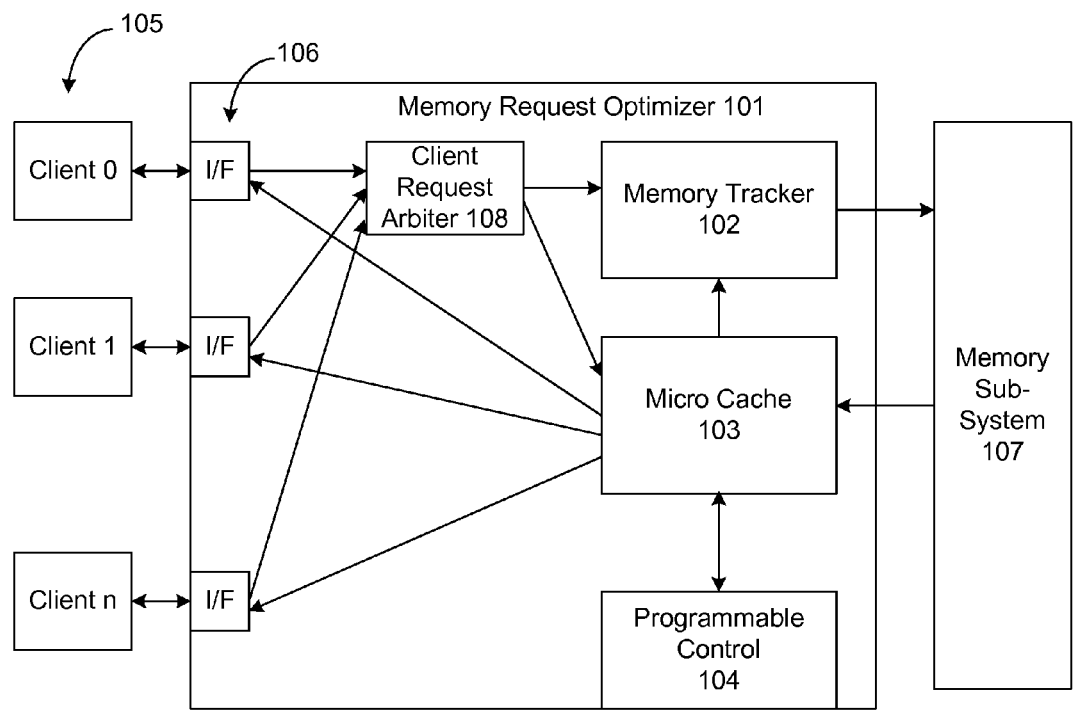
FIG. 1 illustrates a memory request optimizer of an SOC according to embodiments of the present invention.

Embodiments of the present invention comprise a memory request optimizer of an SOC which provides virtual request trackers for tracking read requests. FIG. 1 illustrates a memory request optimizer of an SOC according to embodiments of the present invention. The memory request optimizer 101 includes a memory tracker 102 for providing virtual request trackers and a micro cache 103 for storing prefetched data until accessed by a client. Once the data is provided to the client, the cache space is made available for a future prefetch generated by the memory tracker 102. The performance of the memory request optimizer may be tuned through the programmable control 104. The memory request optimizer 101 receives read requests for data from the memory sub-system 107 from a plurality of clients 105 via interfaces 106. Optionally, a client request arbiter 108 serializes these read requests and presents them to the memory tracker 102 for processing. Alternatively, a network-on-chip, interconnect-on-chip, or fabric, to which the memory request optimizer 101 is coupled, may provide the request serialization to the memory request optimizer 101. Here, multiple client may issue read requests that pass through the interconnect, and the interconnect presents the read requests serially to the memory request optimizer 101 for processing. A plurality of virtual request trackers, described below, of the memory tracker 102 processes multiple read request streams concurrently and analyzes each client's request to determine whether or not to prefetch data using information collected by the virtual request trackers, as described further below. The read request from a client 105 is then forwarded to the memory sub-system 107, and data returned is passed to the client 105. Any data requests from the memory trackers 102 are also forwarded to the memory sub-system 107, and any data returned in response is stored in the micro cache 103 for future access by a client.

Figure 2:
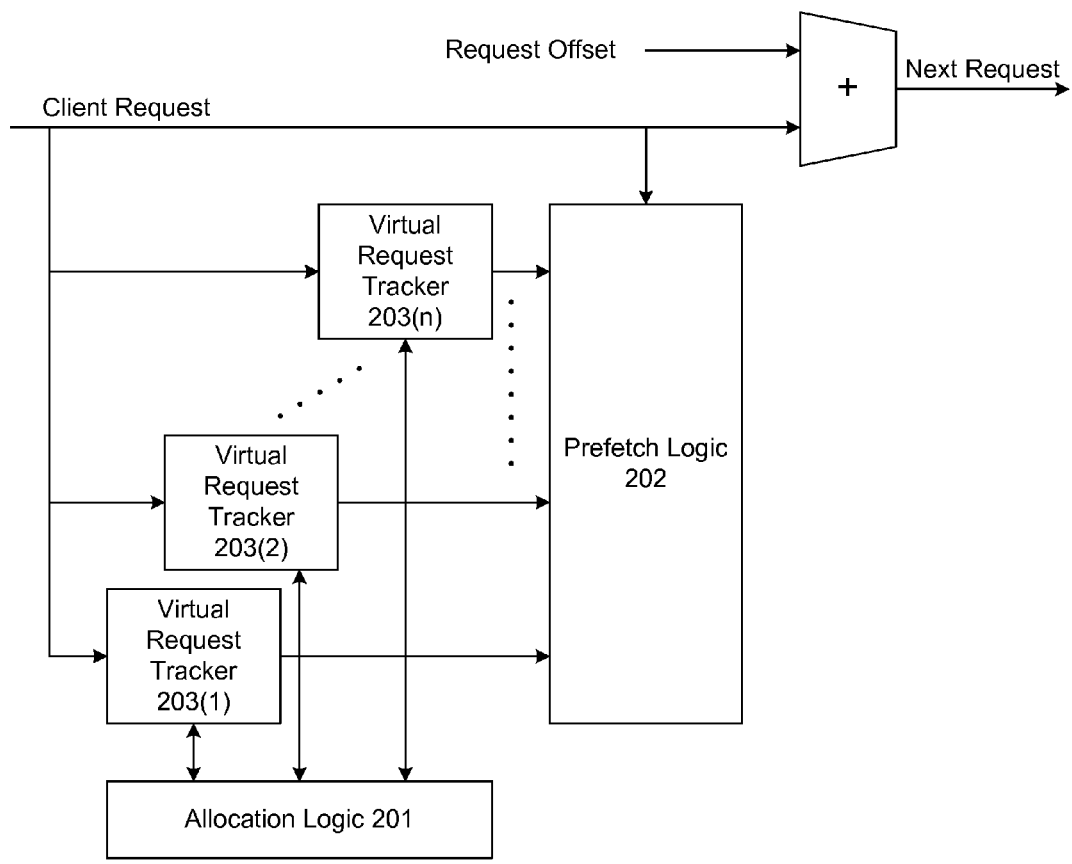
FIG. 2 illustrates in more detail the memory tracker 102 according to embodiments of the present invention.

FIG. 2 illustrates in more detail the memory tracker 102 according to embodiments of the present invention. The memory tracker 102 includes an allocation logic 201 for allocating virtual request trackers 203(1)-203(n) from a pool of available virtual request trackers. In this embodiment, each virtual request tracker comprises hardware that includes an array of linear history registers and logic to increment, shift, and initialize the linear history of the respective virtual request tracker. Each virtual request tracker further includes a register to hold the request address which the respective virtual request tracker is tracking and logic to determine, based on the current mode of operation, whether to prefetch the next request data. The pool is updated using a least recently used (LRU) algorithm. The available number of virtual request trackers in the pool may be configurable via the programmable control 104. Each virtual request tracker may be allocated to track a specific address. Each allocated virtual request tracker counts the number of times the specific address is requested by a client. When a client read request is received, a prefetch logic 202 determines whether or not to prefetch a next request data based on the linear history of counts collected by the virtual request tracker tracking the request address. If so, the prefetch logic 202 obtains the data at a next request address equal to the request address plus a request offset. In this embodiment, the request offset is configurable and may be based on the space in the micro cache 103 reserved for storing prefetched data. The allocation logic 201 and the prefetch logic 202 are described further below.

Figure 3:
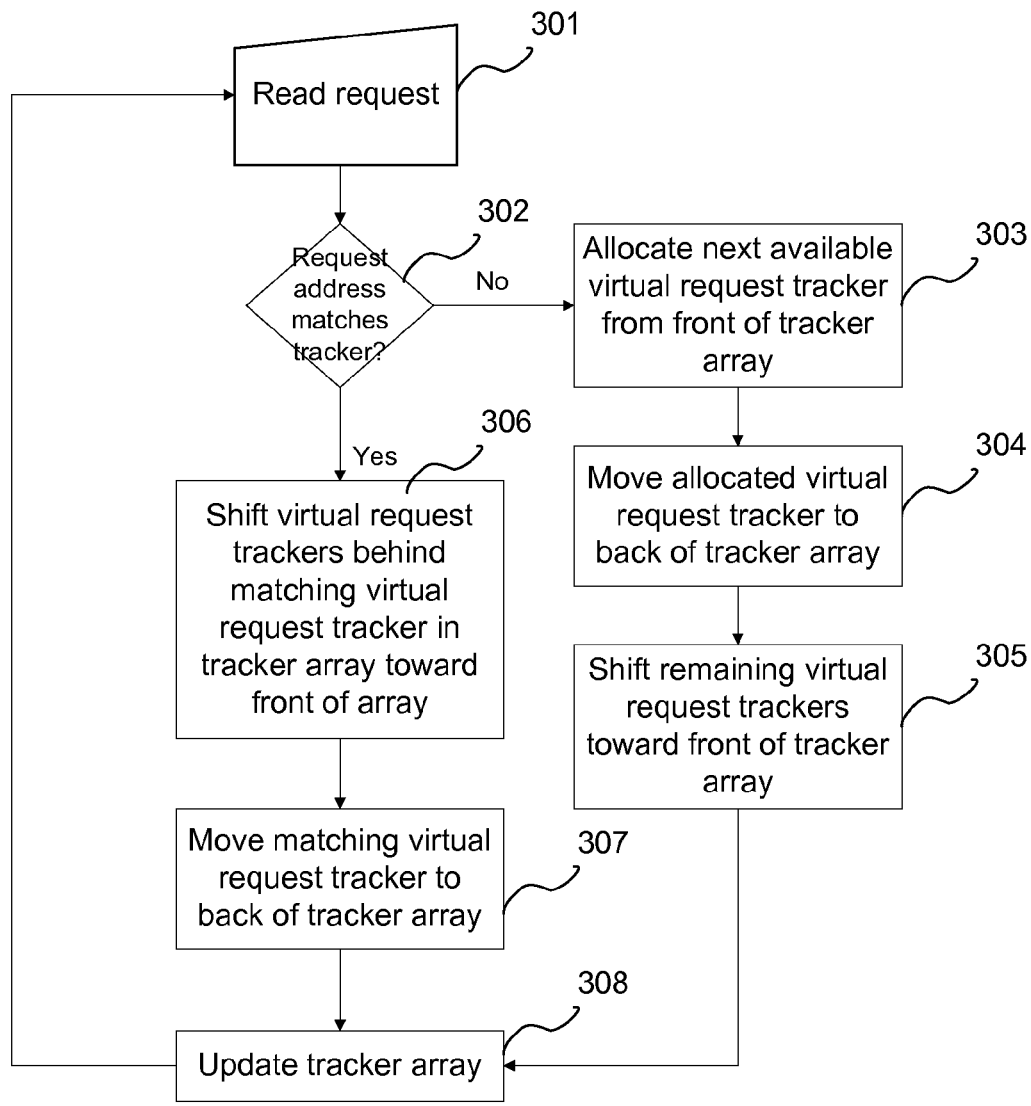
FIG. 3 illustrates in more detail the allocation logic according to embodiments of the present invention.

FIG. 3 illustrates in more detail the allocation logic according to embodiments of the present invention. When a read request for an address is received from a client 105 (301), the allocation logic 201 determines whether the request address matches any of the virtual request trackers 203(1)-203(n) (302). The request address matches a particular virtual request tracker when it is already allocated to track the request address. If the request address does not match any of the virtual request trackers 203(1)-203(n), then the allocation logic 201 allocates the next available virtual request tracker, such as virtual request tracker 203(1), from the front of a tracker array (303). In this embodiment, the elements of the tracker array stores an identifier for each virtual request tracker 203(1)-203(n) in the available virtual request tracker pool. Once the virtual request tracker 203(1) is allocated, it is moved to the back of the tracker array (304), and the remaining virtual request trackers 203(2)-203(n) are shifted toward the front of the tracker array (305). If the request address matches a virtual request tracker, such as virtual request tracker 203(a), (302), then the virtual request trackers 203(2)-203(n) that are behind the matching virtual request tracker 203(1) in the tracker array are shifted toward the front of the tracker array (306), and the matching virtual request tracker 203(1) is moved to the back of the tracker array (307). The tracker array is then updated according to the above changes (308). In this embodiment, the updating of the tracker array is performed on a rise of a clock cycle and is completed within one clock cycle. In this manner, the least used virtual request tracker is at the front of the tracker array, and the most used virtual request tracker is at the back of the tracker array.

FIG. 4A illustrates an example of a tracker array when the request address does not match a virtual request tracker. In this example, assume that the tracker array before allocation contains, from front to back, virtual request tracker identifiers {2, 1, 7, 6, 3, 4, 5, 0}. When the allocation logic 201 determines that the request address does not match any of the virtual request trackers (302), the allocation logic 201 allocates virtual request tracker 2, i.e., the next available virtual request tracker, from the front of the tracker array (303). Virtual request tracker 2 is then moved to the back of the tracker array (304), and the remaining virtual request trackers are shifted toward the front of the tracker array (305). After the allocation, the virtual request tracker identifiers in the updated tracker array are {1, 7, 6, 3, 4, 5, 0, 2}.

FIG. 4B illustrates an example of a tracker array when the request address matches a virtual request tracker. In this example, assume that the tracker array before a match contains, from front to back, virtual request tracker identifiers {2, 1, 7, 6, 3, 4, 5, 0}. Assume that the read request matches virtual request tracker 7 (302). The virtual request trackers behind the virtual request tracker 7, i.e., {6, 3, 4, 5, 0}, are shifted toward the front of the tracker array (306). Virtual request tracker 7 is moved to the back of the tracker array (307). After the match, the virtual request tracker identifiers in the updated tracker array are {2, 1, 6, 3, 4, 5, 0, 7}.

Figure 5:
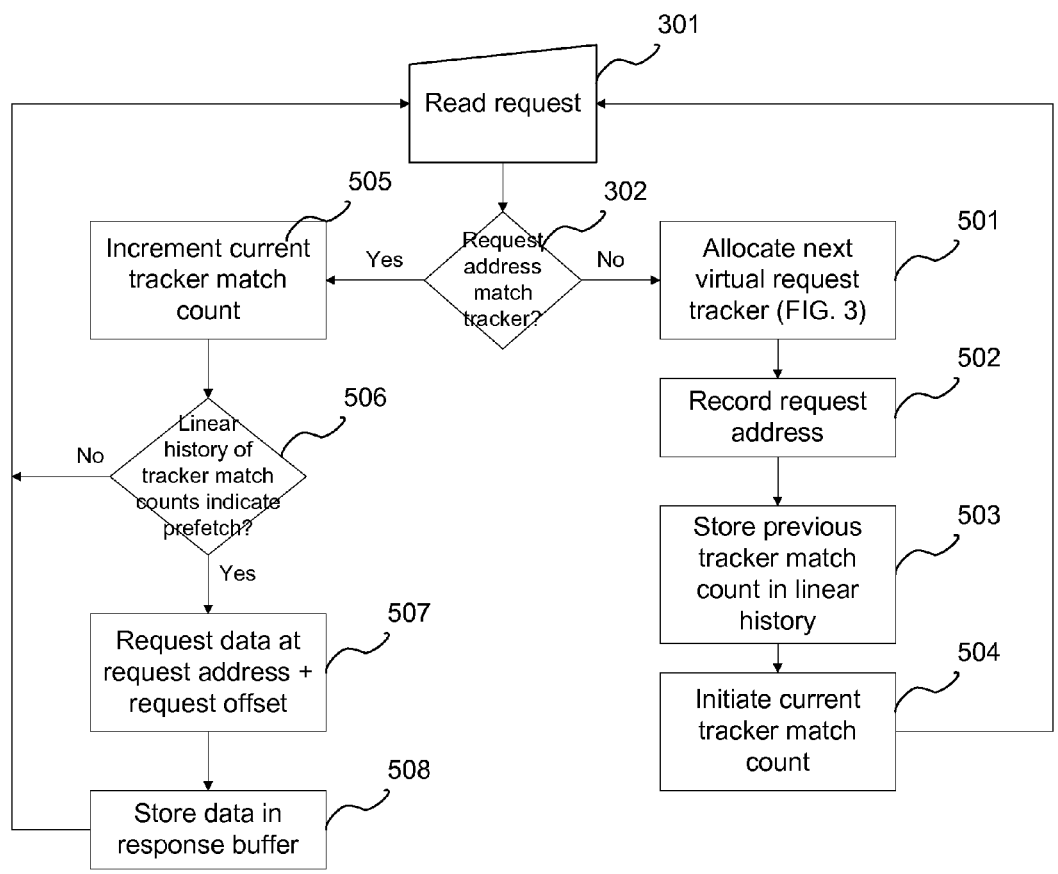
FIG. 5 illustrates in more detail the prefetch logic according to embodiments of the present invention.

FIG. 5 illustrates in more detail the prefetch logic according to embodiments of the present invention. When a read request is received from a client 105 (301), the allocation logic 201 determines whether the request address matches a virtual request tracker (302). If the request address does not match any of the virtual request trackers 203(1)-203(n), then the allocation logic 201 allocates the next available virtual request tracker, such as virtual request tracker 203(1), from the front of the tracker array (501), as described above with FIG. 3. Once allocated, the request address is recorded in the virtual request tracker 203(1) (502). Any previous tracker match count of the virtual request tracker 203(a) is stored (503), and a new current tracker match count is initiated for the virtual request tracker 203(1) (504). If the request address matches a virtual request tracker 203(1) (302), i.e., the virtual request tracker 203(1) is currently allocated to track the request address, the prefetch logic 202 increments the current tracker match count of the virtual request tracker 203(1) (505). Next, the prefetch logic 202 determines whether the linear history of tracker match counts collected by virtual request tracker 203(1) indicates that a next request data prefetch is appropriate based on one or more predetermined criteria (506). If so, then the data at the request address plus a request offset is requested by the prefetch logic 202 (507). Upon receiving the prefetch data, the data is stored in a response buffer (508). In this embodiment, the response buffer is a single cache line within the micro cache 103, and the request offset is the size of the response buffer. The response buffer size may be configurable via the programmable control 104.

In this embodiment, whether a prefetch is determined to be appropriate depends upon a configurable mode. The mode tunes the frequency of prefetches depending on the desired performance and/or power consumption level. Possible modes include a low optimization mode, a moderate optimization mode, and an aggressive optimization mode, as described below. The low optimization mode provides the lowest frequency of prefetches, which also reduces possible false fetches. The moderate optimization mode provides an increase in the frequency of prefetches over the low optimization mode, resulting in increased performance with a slight increase in false fetches. The aggressive optimization mode is a combination of the low and moderate modes. Other possible modes include 'none' and 'all'. With the none mode, the read request passes through the memory request optimizer 101 to the memory sub-system 107 for the fetching of the data at the request address. With the all mode, the next request data is prefetched with each read request received from a client. Although the present invention is described with the above modes, other modes may be possible without departing from the spirit and scope of the present invention.

Figure 6:
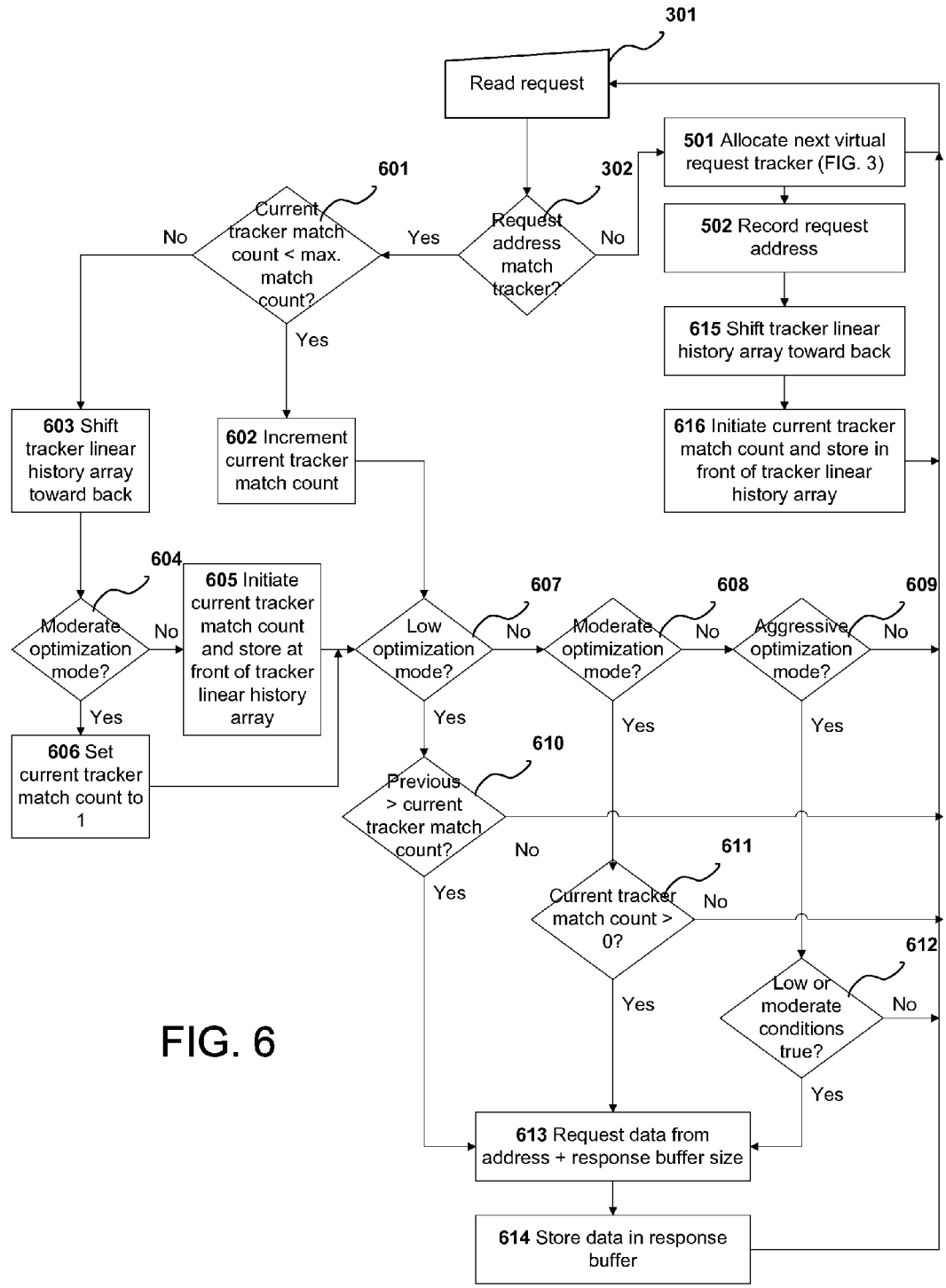
FIG. 6 illustrates the prefetch logic tuned using configurable modes according to embodiments of the present invention.

FIG. 6 illustrates the prefetch logic tuned using configurable modes according to embodiments of the present invention. In this embodiment, each virtual request tracker 203(1)-203(n) has a linear history array that stores the previous tracker match counts of each virtual request tracker 203(1)-203(n), respectively. When the request address does not match any of the virtual request trackers 203(1)-203(n) (302), the next virtual request tracker, such as virtual request tracker 203(1), is allocated as described above with FIG. 3 (501). Once allocated, the request address is recorded in the virtual request tracker 203(1) (502). The tracker linear history array of the virtual request tracker 203(1) is then shifted toward the back of the tracker linear history array (615). A current tracker match count for the virtual request tracker 203(1) is initiated and stored in the front of the tracker linear history array (616). When the request address matches the virtual request tracker 203(1) (302), the prefetch logic 202 compares the current tracker match count of the virtual request tracker 203(1) with the maximum match count (601). For example, assume that the tracker match count is stored in a 4-bit counter. The maximum match count would be the highest number that can be represented by the 4-bits. If the current tracker match count is less than the maximum match count, then the tracker match count is incremented (602). Otherwise, the linear history array of the virtual request tracker 203(1) is shifted toward the back of the tracker linear history array (603). The current tracker match count is then initiated, i.e., allowed to "wrap around", and the current tracker match count is stored at the front of the tracker linear history array (605). Optionally, special consideration may be given to the moderate optimization mode (604), where the current match hit count is set to 1 (606). This option has been found to improve efficiency with a constant request stream.

When the mode is a low optimization mode (607), the prefetch logic 202 compares the previous tracker match count in the tracker linear history array of the virtual request tracker 203(1) with the current tracker match count (610). If the previous tracker match count is greater than the current tracker match count, then the prefetch logic 202 prefetches the next request data by requesting the data from the request address plus the response buffer size as the request offset (613). When the mode is a moderate optimization mode (608), the prefetch logic 202 determines whether the current tracker match count is greater than zero (611). If so, then the prefetch logic 202 prefetches the next request data (613). When the mode is the aggressive optimization mode (609), and if either condition, 610 or 611, for the low and moderate optimization modes are true (612), then the prefetch logic 202 prefetches the next request data (613). The prefetched data is then stored in the response buffer (614).

Embodiments of a memory request optimizer which provides virtual request trackers for tracking read requests have been disclosed. As requests to memory are generated by clients, the memory tracker of the memory request optimizer determines which next request data should be prefetched. The mode of operation set via the programmable control of the memory request optimizer determines in which mode the memory tracker will operate. These modes determine how often prefetches will be generated. The number of virtual request trackers within the memory tracker can also be programmed, allowing further refinement of the prefetch frequency. When the memory request optimizer decides to optimize or prefetch a request, the prefetched data is stored in a micro cache for future access by a client. Embodiments of the memory request optimizer may be incorporated within a L2 cache that's larger than the micro cache, a memory controller, a processor, or an on-chip interconnect.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A memory request optimizer coupled to a plurality of client devices and a memory sub-system, comprising:
   at least one response buffer; and
   a memory tracker for receiving a current request from one of the plurality of client devices, the current request comprising a request address, and determining whether the request address matches one of a plurality of available virtual request trackers, the memory tracker comprising:
       an allocation logic for, if the request address does not match any of the plurality of available virtual request trackers, allocating a given virtual request tracker from the plurality of available virtual request trackers and initializing a current tracker match count to track the request address; and
       a prefetch logic for, when the request address matches the given virtual request tracker of the plurality of available virtual request trackers, the given virtual request tracker comprising the current tracker match count tracking the request address and a linear history array storing one or more previous tracker match counts tracking the request address:
           incrementing the current tracker match count of the given virtual request tracker;
           comparing the current tracker match count with a given previous tracker match count in the linear history array according to a preconfigured performance optimization mode;
           if the comparing of the current tracker match count and the given previous tracker match count indicates that the next request data is to be prefetched according to the preconfigured performance optimization mode, obtaining the next request data at an address equal to the request address plus a preconfigured request offset from the memory sub-system; and
           storing the next request data in the least one response buffer;
           wherein in incrementing the current tracker match count of the given virtual request tracker, the prefetch logic further:
               determines whether the current tracker match count is less than a maximum match count;
               if the current tracker match count is less than the maximum match count, incrementing the current tracker match count; and
               if the current tracker match count is not less than the maximum match count, shifts the linear history array toward a back of the linear history array;
               initiates the current tracker match count; and
               stores the current tracker match count at a front of the linear history array.

2. The memory request optimizer of claim 1, wherein when allocating the given virtual request tracker, the allocation logic further:
   updates the plurality of available virtual request trackers using a least recently used algorithm.

3. The memory request optimizer of claim 2, further comprising a tracker array comprising the plurality of available virtual request trackers, wherein when allocating the given available virtual request tracker, the allocation logic further:
   allocates the given virtual request tracker from a front of the tracker array;
   moves the given virtual request tracker to a back of the tracker array; and
   shifts remaining virtual request trackers of the plurality of available virtual request trackers toward the front of the tracker array.

4. The memory request optimizer of claim 2, further comprising a tracker array comprising the plurality of available virtual request trackers, wherein the allocation logic further, when the request address matches the given virtual request tracker:
   shifts the virtual request trackers behind the given virtual request tracker in the tracker array toward a front of the tracker array; and
   moves the given virtual request tracker to the back of the tracker array.

5. The memory request optimizer of claim 1, wherein the preconfigured performance optimization mode comprises a preconfigured frequency of prefetches.

6. The memory request optimizer of claim 5, wherein the preconfigured performance optimization mode comprises a low optimization mode, wherein the prefetch logic further:
   determines whether the given previous tracker match count is greater than the current tracker match count; and if the given previous tracker match count is greater than the current tracker match count, obtains the next request data at the address equal to the request address plus the preconfigured request offset from the memory sub-system.

7. The memory request optimizer of claim 5, wherein the preconfigured performance optimization mode comprises a moderate optimization mode, wherein the prefetch logic further:
   determines whether the current tracker match count is greater than zero; and
   if the current tracker match count is greater than zero, obtains the next request data at the address equal to the request address plus the preconfigured request offset from the memory sub-system.

8. The memory request optimizer of claim 5, wherein the preconfigured performance optimization mode comprises an aggressive optimization mode, wherein the prefetch logic further:
   determines if the given previous tracker match count is greater than the current tracker match count or if the current tracker match count is greater than zero; and
   if the given previous tracker match count is greater than the current tracker match count or if the current tracker match count is greater than zero, obtains the next request data at the address equal to the request address plus the preconfigured request offset from the memory sub-system.

9. The memory request optimizer of claim 1, wherein if the request address does not match any of the plurality of virtual request trackers, the prefetch logic further:
   records the request address in the given virtual request tracker;
   stores any previous tracker match count of the given virtual request tracker in the linear history array of the given virtual request tracker; and
   initiates the current tracker match count to track the request address.

10. The memory request optimizer of claim 9, wherein the prefetch logic further:
    shifts the linear history array of the given virtual request tracker towards the back of the linear history array of the given virtual request tracker;
    initiates the current tracker match count of the given virtual request tracker; and
    stores the current tracker match count of the given virtual request tracker in the front of the linear history array of the given virtual request tracker.

11. A memory request optimizer coupled to a plurality of client devices and a memory sub-system, comprising:
    at least one response buffer; and
    a memory tracker for receiving a current request from one of the plurality of client devices, the current request comprising a request address, and determining whether the request address matches one of a plurality of available virtual request trackers, the memory tracker comprising a prefetch logic for:
    if the request address matches a given virtual request tracker of the plurality of available virtual request trackers, the given virtual request tracker comprising a current tracker match count tracking the request address and a linear history array storing one or more previous tracker match counts tracking the request address, incrementing the current tracker match count for the given virtual request tracker,
    comparing the current tracker match count with a given previous tracker match count in the linear history array according to a preconfigured performance optimization mode,
    if the comparing of the current tracker match count and the given previous tracker match count indicates that the next request data is to be performed according to the preconfigured performance optimization mode, obtaining the next request data at an address equal to the request address plus a preconfigured request offset from the memory sub-system, and
    storing the next request data in the least one response buffer,
    wherein in incrementing the current tracker match count of the given virtual request tracker, the prefetch logic further:
    determines whether the current tracker match count is less than a maximum match count;
    if the current tracker match count is less than the maximum match count, incrementing the current tracker match count; and
    if the current tracker match count is not less than the maximum match count, shifts the linear history array toward a back of the linear history array;
    initiates the current tracker match count; and
    stores the current tracker match count at a front of the linear history array.

12. The memory request optimizer of claim 11, wherein the preconfigured performance optimization mode comprises a low optimization mode, wherein the prefetch logic further:
    determines whether the given previous tracker match count is greater than the current tracker match count; and
    if the given previous tracker match count is greater than the current tracker match count, obtains the next request data at the address equal to the request address plus the preconfigured request offset from the memory sub-system.

13. The memory request optimizer of claim 11, wherein preconfigured performance optimization mode comprises a moderate optimization mode, wherein the prefetch logic further:
    determines whether the current tracker match count is greater than zero; and
    if the current tracker match count is greater than zero, obtains the next request data at the address equal to the request address plus the preconfigured request offset from the memory sub-system.

14. The memory request optimizer of claim 11, wherein the preconfigured performance optimization mode comprises an aggressive optimization mode, wherein the prefetch logic further:
    determines if the given previous tracker match count is greater than the current tracker match count or if the current tracker match count is greater than zero; and
    if the given previous tracker match count is greater than the current tracker match count or if the current tracker match count is greater than zero, obtains the next request data at the address equal to the request address plus the preconfigured request offset from the memory sub-system.

15. The memory request optimizer of claim 11, wherein if the request address does not match any of the plurality of virtual request trackers, the prefetch logic further:
    records the request address in the given virtual request tracker;

stores any previous tracker match count of the given virtual request tracker in the linear history array of the given virtual request tracker; and initiates the current tracker match count to track the request address.

* * * * *